United States Patent Office 3,470,301
Patented Sept. 30, 1969

3,470,301
ANTIDEPRESSANT COMPOSITIONS AND METHODS EMPLOYING α-AMINODESOXYBENZOIN DERIVATIVES
David John Gilman, Macclesfield, England, assignor to Imperial Chemical Industries Limited, London, England, a corporation of Great Britain
No Drawing. Filed July 20, 1967, Ser. No. 654,686
Claims priority, application Great Britain, Aug. 4, 1966, 34,977/66; Oct. 24, 1966, 47,605/66
Int. Cl. A61k 27/00
U.S. Cl. 424—331                                5 Claims

ABSTRACT OF THE DISCLOSURE

A method of producing an antidepressant effect by the administration of α-aminodesoxybenzoin derivatives, pharmaceutical compositions containing the said derivatives and methods for the manufacture of novel α-aminodesoxybenzoin derivatives.

---

This invention relates to a method of treatment, and more particularly it relates to a method of producing an antidepressant effect.

It is known that the compound, α-N-morpholino-desoxybenzoin possesses sleep-inducing properties, but we have now found that this, and other compounds, possess antidepressant properties. These compounds are able to reverse or prevent reserpine-induced hypothermia in mice, and are therefore considered to be useful for the treatment of depression in humans.

According to the invention we provide a method for producing an antidepressant effect in man and animals which comprises administering an effective amount of a desoxybenzoin derivative selected from compounds of the formula:

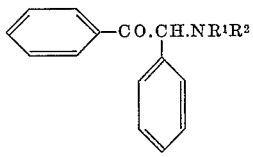

wherein $R^1$ stands for hydrogen or an alkyl radical of 1–3 carbon atoms, $R^2$ stands for an alkyl radical of 1–3 carbon atoms, an alkenyl radical of 2–6 carbon atoms, a hydroxyalkyl radical of 1–4 carbon atoms, or an aralkyl radical of 7–10 carbon atoms, or wherein $R^1$ and $R^2$ are joined together with the adjacent nitrogen atom to form a 5- or 6-membered saturated heterocyclic radical optionally containing an oxygen atom as an additional hetero-atom, and the pharmaceutically-acceptable salts thereof.

As a suitable value for $R^1$ when it stands for an alkyl radical of 1–3 carbon atoms there may be mentioned, for example, the ethyl or n-propyl radical.

As a suitable value for $R^2$ when it stands for an alkyl radical of 1–3 carbon atoms there may be mentioned, for example, the methyl, ethyl, n-propyl, or isopropyl radical, and as a suitable value for $R^2$ when it stands for an alkenyl radical of 2–6 carbon atoms there may be mentioned, for example, the allyl radical. As a suitable value for $R^2$ when it stands for a hydroxyalkyl radical of 1–4 carbon atoms there may be mentioned, for example, the 2-hydroxyethyl radical, and as a suitable value for $R^2$ when it stands for an aralkyl radical of 7–10 carbon atoms there may be mentioned, for example, the 2-phenylethyl radical.

As a suitable value for the 5- or 6-membered saturated heterocyclic radical formed from $R^1$ and $R^2$ together with the adjacent nitrogen atom there may be mentioned, for example, the pyrrolidino, piperidino or morpholino radical.

As specific desoxybenzoin derivatives which may be administered according to the invention there may be mentioned, for example, 2-N-morpholino-, 2-N-piperidino-, 2-N-pyrrolidino-, 2-diethylamino-, 2-methylamino-, 2-ethylamino-, 2 - (2 - hydroxyethyl)amino-, 2 - (2-phenylethyl)amino-, 2-allylamino-, 2-di-n-propylamino-, 2-isopropylamino- and 2-n-propylamino-1,2-diphenylethan-1-one, and the pharmaceutically-acceptable salts thereof.

Preferred desoxybenzoin derivatives are, for example, 2-N-morpholino-, 2-N-piperidino-, 2-N-pyrrolidino-, 2-methylamino-, 2-(2-phenylethyl)amino-, 2-allylamino- and 2-n-propylamino-1,2-diphenyl-ethan-1-one, and the pharmaceutically-acceptable salts thereof.

As suitable pharmaceutically-acceptable salts there may be mentioned, for example, salts derived from inorganic acids, for example hydrochlorides, hydrobromides, phosphates or sulphates, salts derived from organic acids, for example acetates, benzoates, oxalates, citrates, lactates, adipates or 1,1'-methylene-bis-2-hydroxy-3-naphthoates or salts derived from acidic synthetic resins, for example sulphonated polystyrene resins, for example "Zeo-Karb" 225 ("Zeo-Karb" is a trademark). Relatively insoluble salts, for example the 1,1'-methylene-bis-2-hydroxy-3-naphthoates, have the advantage that they afford prolonged blood levels of the desoxybenzoin derivatives.

The said desoxybenzoin derivatives may be administered in the form of pharmaceutical compositions, and therefore according to a further feature of the invention, we provide a pharmaceutical composition which comprises at least one of the desoxybenzoin derivatives which may be used in the above method for producing an antidepressant effect, or a pharmaceutically-acceptable salt thereof, together with a pharmaceutically-acceptable diluent or carrier.

Such a pharmaceutical composition may be, for example, in the form of a tablet, capsule, elixir, aqueous or oily solution, aqueous or oily suspension, emulsion, sterile injectable aqueous or oily solution or suspension, or dispersible powder.

Suitable tablets may be formulated by admixture of the active ingredient(s) with known pharmaceutical excipients, for example inert diluents, for example calcium carbonate, calcium phosphate, lactose or mannitol, disintegrating agents, for example maize starch or alginic acid, binding agents, for example starch, gelatin or acacia mucilage, and lubricating agents, for example magnesium stearate, stearic acid or talc. Such tablets may optionally be coated by known techniques in order to delay disintegration in the stomach and thus to provide a sustained action over an extended period.

The aqueous suspensions, emulsions, oily solutions and suspensions generally contain a sweetening agent, for example glycerol, dextrose or sucrose, and a flavouring agent, for example vanillin or orange extract, in order to provide a palatable product. The aqueous suspensions may also contain suitable suspending or thickening agents, for example sodium carboxymethyl-cellulose, wetting agents, for example condensation products of fatty alcohols with ethylene oxide, and suitable preservatives, for example methyl or propyl p-hydroxybenzoate.

The emulsions may contain the active ingredient(s) dissolved in an oil of vegetable or animal origin, for example arachis oil or cod liver oil, and may also contain emulsifying agents and dispersing agents, for example soya bean lecithin, polyoxyethylene sorbitan mono-oleate, gum acacia, gum tragacanth or casein, and preservatives, for example methyl or propyl p-hydroxybenzoate, and anti-oxidants, for example propyl gallate.

The oily solutions likewise contain the active ingredient(s) in solution in an oil of vegetable or animal origin and may optionally contain flavouring agents to mask the taste and improve oral acceptability. Such oily solutions may advantageously be filled into soft gelatin capsules.

Oral compositions in the form of gelatin capsules may consist of capsules containing the active ingredient(s) only, or the capsules may contain the active ingredient(s) in admixture with inert diluents, for example lactose or sorbitol.

The sterile injectable aqueous suspensions may contain the active ingredient(s) in admixture with inert diluents, for example lactose or sorbitol.

The sterile injectable aqueous suspensions may contain a suspending or thickening agent, for example polyvinylpyrrolidone, and a wetting or dispersing agent, for example a phenolpolyethylene oxide condensate, for example the condensation product of octylcresol with about 8–10 molecular proportions of ethylene oxide. The injectable oily solutions may contain a non-toxic injectable oil, for example arachis oil or ethyl oleate, and they may additionally contain a gelling agent, for example aluminum stearate, to delay absorption within the body. These aqueous and oily injectable preparations may contain preservatives, for example methyl or n-propyl p-hydroxybenzoate or chlorobutanol.

It is visualised that the compositions of this invention will be administered to humans suffering from depressive illness, for example endogenous or reactive depression. For the treatment of these conditions, the preferred compositions are tablets, capsules or elixirs for oral administration, and injectable solutions for parenteral administration. The compositions may be administered so that each human receives a total daily dose of between 25 and 300 mg., preferably between 75 and 200 mg. The dose may be divided into three or four doses administered at intervals during the day, and for this purpose, tablets containing between 25 and 50 mg. of desoxybenzoin derivative are convenient. As is the practice in the treatment of depressive illness, the administration of the compositions may be continued for several weeks, and the actual dose received by an individual patient may be varied to suit his particular needs.

Some of the compounds which may be used in the method and pharmaceutical compositions of the invention are new compounds, and therefore according to a further feature of the invention we provide desoxybenzoin derivatives of the formula:

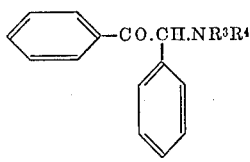

wherein $R^3$ stands for hydrogen or an alkyl radical of 1–3 carbon atoms, and $R^4$ stands for an alkenyl radical of 2–6 carbon atoms or for the n-propyl or isopropyl radical, and the pharmaceutically-acceptable salts thereof.

As a suitable value for $R^3$ when it stands for an alkyl radical of 1–3 carbon atoms there may be mentioned, for example, the n-propyl radical, and as a suitable value for $R^4$ when it stands for an alkenyl radical of 2–6 carbon atoms there may be mentioned for example, the allyl radical.

Specific new desoxybenzoin derivatives are, for example, 2-allylamino-, 2-di-n-propylamino-, 2-isopropylamino- and 2-n-propylamino-1,2-diphenylethan-1-one, and the pharmaceutically-acceptable salts thereof.

According to a further feature of the invention we provide a process for the manufacture of the new desoxybenzoin derivatives of the invention which comprises the interaction of a halogeno compound of the formula:

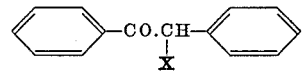

wherein X stands for a halogen atom, with an amine of the formula $R^3R^4NH$, wherein $R^3$ and $R^4$ have the meanings stated above.

As a suitable value for X there may be mentioned, for example, the chlorine or bromine atom. The interaction may be carried out in an inert diluent or solvent, for example toluene, and it may be accelerated or completed by the application of heat.

According to a further feature of the invention we provide a process for the manufacture of the new desoxybenzoin derivatives of the invention which comprises the interaction of benzoin with an amine of the formula $R^3R^4NH$, wherein $R^3$ and $R^4$ have the meanings stated above, under dehydrating conditions.

The dehydrating conditions may be provided by the presence of, for example, phosphorus pentoxide. Alternatively, the interaction may be carried out in the presence of a water-entraining solvent and the water removed by means of a Dean and Stark apparatus. As a suitable water-entraining solvent there may be mentioned, for example, benzene or toluene.

According to a further feature of the invention we provide a process for the manufacture of those of the new desoxybenzoin derivatives of the invention wherein $R^3$ stands for hydrogen and $R^4$ stands for the n-propyl or isopropyl radical, which comprises the interaction of benzil with an amine of the formula $R^5NH_2$, wherein $R^5$ stands for the n-propyl or isopropyl radical, under reducing conditions.

The reducing conditions may be conveniently provided by, for example, hydrogen and a hydrogenation catalyst, for example palladium-on-carbon. The interaction may be carried out in a diluent or solvent, for example ethanol or ethyl acetate, and it may be accelerated or completed by the application of heat.

The above process may be presumed to proceed by way of the condensation product of the benzil with the amine, and so as a further feature of the invention, we provide a process for the manufacture of those of the desoxybenzoin derivatives of the invention wherein $R^3$ stands for hydrogen and $R^4$ stands for the n-propyl or isopropyl radical, which comprises the reduction of an anil of the formula:

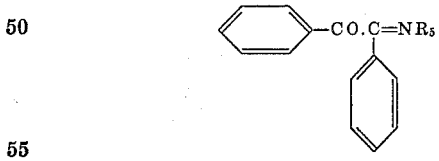

wherein $R^5$ has the meaning stated above.

Suitable reducing conditions are the same as those described above.

The invention is illustrated but not limited by the following examples in which the parts are by weight.

Example 1

A mixture of 21.2 parts of benzoin, 7.6 parts of allylamine and 200 parts of benzene is stirred and heated under reflux in a Dean and Stark apparatus during 4 hours while approximately 2.5 parts of a mixture of water and allylamine are collected in the side-arm of the apparatus. The mixture is evaporated until about 50 parts of benzene have been removed, and then the residue is cooled to 10° C. and stirred while 20 parts of concentrated hydrochloric acid are added. The precipitated solid is filtered off, washed with 20 parts of benzene, and crystallised from a mixture of ethanol and petroleum ether (B.P. 60–80° C.). There is thus obtained 2-allylamino-1,2-diphenylethan-1-one hydrochloride, M.P. 208° C.

Example 2

11 parts of isopropyliminodesoxybenzoin are dissolved in 100 parts of ethyl acetate, 0.5 part of 5% palladium-on-carbon is added, and the mixture is shaken at ambient temperature in an atmosphere of hydrogen until absorption of hydrogen ceases. The resulting solution is filtered, and the filtrate is evaporated. The residue is dissolved in 200 parts of benzene and 16 parts of concentrated hydrochloric acid are added. The mixture is dried by being heated under reflux in a Dean and Stark apparatus. The whole is cooled, and the solid filtered off and recrystallised from a mixture of ethanol and ethyl acetate. There is thus obtained 2-isopropylamino-1,2-diphenylethan-1-one hydrochloride, M.P. 220–223° C.

Example 3

A mixture of 23 parts of desyl chloride, 10 parts of di-n-propylamine and 50 parts of toluene is heated under reflux for 4 hours. The mixture is cooled and stirred while 70 parts of 2 N sodium hydroxide solution are added. The upper (toluene) phase is then separated, and the lower (aqueous) phase is extracted three times, each time with 50 parts of benzene. The benzene extracts are combined with the toluene phase, and the whole is washed with 100 parts of water, dried over anhydrous magnesium sulphate, filtered, and the solevnt evaporated. The residue is dissolved in 50 parts of dry ether, the solution is filtered and then saturated with gaseous hydrogen chloride and left to stand for a few minutes. The ether is decanted from the precipitated sticky solid which is then recrystallised from acetonitrile. There is thus obtained 2 - di-n-propylamino-1,2-diphenylethan-1-one hydrochloride, M.P. 195–197° C.

Example 4

A mixture of 10.5 parts of benzil, 8.9 parts of n-propylamine, 50 parts of ethanol, 40 parts of water and 0.25 part of 5% palladium-on-carbon is shaken at ambient temperature in an atmosphere of hydrogen until one molecular equivalent of hydrogen has been absorbed. 1 part of activated charcoal is added to the reaction mixture which is shaken for 5 minutes, filtered and the filtrate evaporated to one fifth of its original volume. 20 parts of concentrated hydrochloric acid and 250 parts of benzene are added, and the mixture is dried by being heated under reflux in a Dean and Stark apparatus. The resulting mixture is cooled, and the solid filtered off, washed twice, each time with 20 parts of petroleum ether (B.P. 60–80° C.). The solid is then recrystallised from a mixture of 100 parts of dioxan and 22 parts of water and dried for 2 hours at 60° C. under reduced pressure. There is thus obtained 2-n-propylamino-1,2-diphenyl-ethan-1-one hydrochloride containing half a molecular proportion of dioxan of crystallisation and having a melting point of 216–221° C.

Example 5

A mixture of 25 parts of 2-allylamino-1,2-diphenyl-ethan-1-one hydrochloride and 55 parts of lactose is granulated by admixture with the required amount of 10% maize starch paste. The granules are passed through a 30-mesh sieve, dried, mixed with 1 part of magnesium stearate and compressed to give tablets suitable for administration to patients.

The above procedure is repeated except that the 2-allylamino-1,2-diphenylethan-1-one is replaced by 2-di-n-propylamino-, 2-isopropylamino- or 2-n-propylamino-1,2-diphenylethan-1-one, and there is thus obtained a corresponding tablet composition suitable for administration to patients.

Example 6

The process described in Example 5 is repeated except that the 2-allylamino-1,2-diphenylethan-1-one is replaced by 2 N morpholino-, 2 N piperidino-, 2 N pyrrolidino-, 2-diethylamino-, 2-methylamino-, 2-ethylamino-, 2-(2-hydroxyethyl)amino- or 2-(2-phenylethyl)amino-1,2-diphenylethan-1-one, and there is thus obtained a corresponding tablet composition suitable for administration to patients.

Example 7

The method of producing an antidepressant effect is illustrated by the following experiment:

Each member of a group of 6 mice was given 2 mg. per kg. of bodyweight of reserpine by intravenous injection, and 17 hours later, the gastric temperature of each mouse was measured by means of a temperature probe inserted by mouth. The temperature was indicated on a calibrated electrical thermometer. Immediately after measuring the gastric temperature ($T_0$), a dose of the test compound was administered orally to each mouse. The gastric temperature of each mouse was then recorded at 2, 4 and 6 hours ($T_2$, $T_4$ and $T_6$) after the administration of the test compound. The gastric temperature of each member of a control group of 6 mice, treated only with reserpine, was measured at the same time as the treated group. The cumulative temperature change $\Sigma$ $(T_2+T_4+T_6-3T_0)$ was calculated for the treated and control groups. The experiment was repeated using different doses of test compound, and the dose required to produce a difference of 10° C. between the cumulative temperature change for the treated and control groups was calculated ($ED_{10}$). The results obtained are given below.

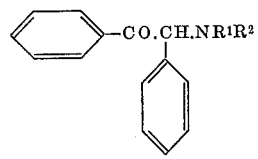

| Test compound —$NR^1R^2$ | $ED_{10}$, mg./kg. |
|---|---|
| N-morpholino | 11 |
| N-piperidino | 14 |
| N-pyrrolidino | 22 |
| Diethylamino | 40 |
| Methylamino | 10 |
| Ethylamino | 40 |
| 2-hydroxyethylamino | 60 |
| 2-phenylethylamino | 15 |
| Allylamino | 24 |
| Di-n-propylamino | 48 |
| Isopropylamino | 40 |
| n-Propylamino | 25 |

What we claim is:

1. A method for producing an antidepressant effect in a host in need of such effect which comprises administering to said host an amount of a desoxybenzoin derivative sufficient to produce said antidepressant effect, said derivative being selected from compounds of the formula:

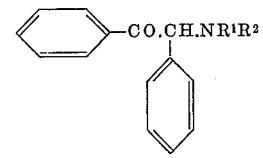

wherein $R^1$ is hydrogen or alkyl of 1–3 carbon atoms, $R^2$ is alkyl of 1–3 carbon atoms, alkenyl of 2–6 carbon atoms, hydroxyalkyl of 1–4 carbon atoms, or aralkyl of 7–10 carbon atoms, and the pharmaceutically-acceptable salts thereof.

2. A method as claimed in claim 1 wherein $R^1$ is hydrogen, ethyl or n-propyl, $R^2$ is methyl, ethyl, n-propyl, isopropyl, allyl, 2-hydroxyethyl or 2-phenylethyl.

3. A method as claimed in claim 1 wherein the desoxybenzoin derivative is selected from the group consisting of 2-diethylamino-, 2-methylamino-, 2-ethylamino-, 2-(2-hydroxyethyl)amino-, 2 - (2 - phenylethyl)amino-, 2-allylamino-, 2 - di - n - propylamino-, 2 - isopropylaminoand 2 - n - propylamino - 1,2 - diphenylethan - 1 - one, and the pharmaceutically-acceptable salts thereof.

4. An antidepressant composition in the form of a tablet, capsule, elixir, oily solution, oily suspension, emulsion, sterile injectable aqueous or oily solution or suspension or a dispersible powder, which comprises, as the essential active component, an amount of a desoxybenzoin derivative sufficient to produce an antidepressant effect, said derivative being selected from compounds of the formula:

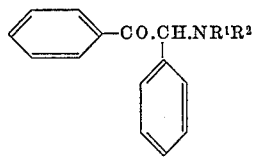

wherein $R^1$ is hydrogen or alkyl of 1–3 carbon atoms, and $R^2$ is alkenyl of 2–6 carbon atoms, n-propyl or isopropyl, or a pharmaceutically-acceptable salt thereof, together with a major amount of a pharmaceutically-acceptable carrier therefor.

5. A pharmaceutical composition as claimed in claim 4, wherein the desoxybenzoin derivative is 2-allylamino-1,2-diphenylethan-1-one or a pharmaceutically-acceptable salt thereof.

References Cited

Chem. Abst. I, Vol. 53, Sub. Index A, p. 49S (1959).
Chem. Abst. II, Vol. 48, Sub. Index A, p. 52S (1954).
Chem. Abst. III, Vol. 52, Sub. Index A, p. 50S (1958).
J.A.C.S., Vol. 70, p. 2015–2016 (1948).

ALBERT T. MEYERS, Primary Examiner
STANLEY J. FRIEDMAN, Assistant Examiner

U.S. Cl. X.R.

260—247.7, 294.7, 326.5, 570.5, 570.8; 424—248, 267, 274